(12) United States Patent
Bayer et al.

(10) Patent No.: US 11,585,418 B2
(45) Date of Patent: Feb. 21, 2023

(54) HYDRODYNAMIC TORQUE CONVERTER WITH A LOCK-UP CLUTCH

(71) Applicant: ZF Friedrichshafen AG, Friedrichshafen (DE)

(72) Inventors: Ewgeni Bayer, Sipplingen (DE); Ralf Beck, Oberteuringen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/528,865

(22) Filed: Nov. 17, 2021

(65) Prior Publication Data

US 2022/0170540 A1     Jun. 2, 2022

(30) Foreign Application Priority Data

Nov. 27, 2020   (DE) ..................... 10 2020 214 926.7

(51) Int. Cl.
*F16H 45/02*     (2006.01)

(52) U.S. Cl.
CPC ..... *F16H 45/02* (2013.01); *F16H 2045/0221* (2013.01); *F16H 2045/0284* (2013.01)

(58) Field of Classification Search
CPC ............. F16H 45/02; F16H 2045/0221; F16H 2045/0284; F16D 13/52; F16D 25/0638
See application file for complete search history.

(56) References Cited

U.S. PATENT DOCUMENTS

| | | | |
|---|---|---|---|
| 7,225,908 B2 | 6/2007 | Back et al. | |
| 2008/0277227 A1 | 11/2008 | Jameson et al. | |
| 2008/0308374 A1 | 12/2008 | Heukelbach et al. | |
| 2013/0056319 A1 * | 3/2013 | Lindemann | F16H 45/02 60/330 |

FOREIGN PATENT DOCUMENTS

| | | | | |
|---|---|---|---|---|
| DE | 103 50 935 A1 | 5/2004 | | |
| DE | 10 2005 051 739 A1 | 5/2007 | | |
| DE | 10 2008 020 684 A1 | 11/2008 | | |
| WO | WO-2013069595 A1 * | 5/2013 | ............. | B60K 6/387 |
| WO | WO-2014157978 A1 * | 10/2014 | ............. | F16D 13/70 |

OTHER PUBLICATIONS

Machine translation of KR101989183B1 retrieved from espacenet.com on Jun. 29, 2022 (Year: 2022).*
German Search Report Corresponding to 10 2020 214 926.7 dated Jul. 1, 2021.

* cited by examiner

*Primary Examiner* — Stacey A Fluhart
(74) *Attorney, Agent, or Firm* — Finch & Maloney PLLC

(57) ABSTRACT

A hydrodynamic torque converter (1) with a lock-up clutch (6) in the form of a disk clutch in a clutch space (9) and with a piston (7) for actuating the lock-up clutch (6). The lock-up clutch (6) has an end disk (63) and a first disk carrier (61), on which the end disk (63) is radially and axially supported. The end disk (63) is arranged on the side of the lock-up clutch (6) remote from the piston (7). The lock-up clutch (6) has a second disk carrier (62). A sealing element (64) is provided, on the second disk carrier (62), a sealing gap (12) is formed between the end disk (63) and the sealing element (64).

10 Claims, 2 Drawing Sheets

HYDRODYNAMIC TORQUE CONVERTER WITH A LOCK-UP CLUTCH

This application claims priority from German patent application serial no. 10 2020 214 926.7 filed Nov. 27, 2020.

FIELD OF THE INVENTION

The invention relates to a hydrodynamic torque converter with a lock-up clutch.

BACKGROUND OF THE INVENTION

Hydrodynamic torque converters are clutches that work in accordance with the Föttinger principle. Thanks to their virtually wear-free mode of operation, they are used in numerous technical fields for the transmission and/or translation of rotary movements. These torque converters often have a converter lock-up clutch, also called a lock-up clutch for short. This serves, among other things, to enable the otherwise hydrodynamic coupling of the converter to be bridged across by a mechanical coupling, if need be. In that way, power losses in the converter can be minimized.

In automotive technology, hydrodynamic torque converters are often used as a wear-free starter clutch and/or as an integral transmission shifting element. In this context the torque converter is provided, in particular, on the input side or as a central shifting element of a multi-gear motor vehicle transmission. Thus, the torque converter is connected to the transmission in a torque-transmitting manner. In the hydrodynamic operation of the torque converter, drive power is transmitted in it by means of a hydraulic fluid. This takes place virtually without any wear, and, for the most part, the hydraulic fluid absorbs the produced heat losses. Accordingly the torque converter is often connected to a cooling system of the transmission and/or the motor vehicle. Heat energy is produced in particular in the hydrodynamic torus of the converter and, as frictional loss, at the lock-up clutch.

From DE 10 2005 051 739 A1, a hydrodynamic torque converter with a lock-up clutch and a torsion damper is known. The lock-up clutch is designed to show constant behavior over a very long lifetime. For this, direct cooling of the clutch disks of the lock-up clutch by way of an axial piston of the converter and the torsion damper is proposed.

SUMMARY OF THE INVENTION

The purpose of the present invention is to improve upon the prior art. In particular, the torque converter should be simple to produce and should enable effective cooling of the lock-up clutch.

This objective is achieved by the characteristics specified in the principal claim. Preferred embodiments thereof emerge from the subordinate claims.

According to these, a hydrodynamic torque converter is proposed, which has a lock-up clutch in a clutch space and a piston for actuating the lock-up clutch. The lock-up clutch is in the form of a disk clutch. In particular, the disk clutch comprises a plurality of clutch disks which can be pressed against one another by the piston. The clutch can optionally be disengaged and engaged by selecting the pressing force of the piston. Positions are also possible in which the clutch is only partially disengaged and thus in which the maximum possible torque cannot be transmitted by the clutch.

In the present case, the lock-up clutch has an end disk and a first disk carrier on which the end disk is supported radially and axially. This end disk is arranged on the side of the lock-up clutch facing away from the piston. Thus, the end disk is located at the end of the clutch opposite to the piston. The lock-up clutch also comprises a second disk carrier. When the clutch is engaged, the first and second disk carriers are rotationally coupled with one another by the clutch disks pressed together. When the clutch is open, the clutch disks are apart and the coupling is, therefore, released. In particular, the clutch disks are coupled rotationally fixed to the first disk carrier and to the second disk carrier in alternation.

A sealing element is now provided, which is arranged on the second disk carrier. By virtue of this sealing element a sealing gap is formed between the end disk and the sealing element.

At that point of the clutch, the sealing gap increases the flow resistance, for hydraulic fluid flowing through the lock-up clutch, in a controlled manner. In this way, the hydraulic fluid is compelled also to flow through other parts of the clutch. In particular, more of the hydraulic fluid thereby flows through the clutch in the radial direction and thus along the friction surfaces of the flap disks. Accordingly, the hydraulic fluid take up substantially more heat from the disks and carries it away. The clutch is, therefore, more effectively cooled. At the same time, this design does not require many additional components, so the torque converter can be produced relatively simply.

The terms "axial" and "radial" used here relate, in each case, to the main rotation axis of the torque converter for the intended operation of the converter. Thus, the main rotation axis is, at the same time, the longitudinal axis of the torque converter. So the axial direction extends along or in the direction of the main rotation axis, whereas the radial direction extends perpendicularly thereto.

In particular, the end disk is arranged at least rotationally fixed on the first disk carrier. Thus, when a relative rotation takes place between the first and second disk carriers, a relative rotation can also take place between the end disk and the sealing element. The sealing gap allows this relative rotation. At the same time the sealing element prevents or impedes the hydraulic fluid from moving into this area. In particular, the end disk engages in teeth of the first disk carrier. The said teeth are, in particular, also used to arrange first disks of the disk clutch on the first disk carrier in a rotationally fixed manner. The teeth can be formed by a corrugated structure of the second disk carrier that extends in the circumferential direction. The end disk can be formed as a ring with teeth directed toward the first disk carrier. These teeth engage with the teeth of the first disk carrier. In that way, the position of the end disk on the first disk carrier can be fixed in the radial direction and in the circumferential direction. In particular, the surface of the end disk facing in the direction of the sealing element must be formed around the sealing gap in the shape of a cylinder.

In particular, the end disk is supported on the first disk carrier only in an axial direction. The end disk can be supported, in the axial direction, on the first disk carrier by means of a ring, for example, by means of a spring-ring. By virtue of the ring, the end disk is also secured against falling off the first disk carrier. This ring absorbs the actuating force exerted by the piston on the disks and transmits it to the first disk carrier. Thereby, the disks can be pressed against one another.

The sealing element is, in particular, arranged radially between the end disk and the second disk carrier. The sealing element is preferably annular. The sealing element can be pushed onto the second disk carrier. In particular, the sealing element is arranged at least rotationally fixed on the second disk carrier. For this, in particular, the sealing element engages in teeth of the second disk carrier. In particular, the said teeth are also used for positioning second disks of the disk clutch in a rotationally fixed manner on the second disk carrier. The teeth can be formed by a corrugated structure of the second disk carrier that extends in the circumferential direction. The sealing element can be formed as a ring with teeth directed toward the second disk carrier. In that way, the position of the sealing element, in the radial and circumferential directions on the second disk carrier, can be fixed. In particular, the surface of the sealing element facing toward the end disk must be made as a cylinder around the sealing gap.

In particular, the sealing element is arranged fixed on the second disk carrier. The sealing element is preferably pressed or clamped against the second disk carrier so that the sealing element can be fastened as simply as possible.

The lock-up clutch is arranged in the clutch space and the piston serves to actuate the lock-up clutch. The piston separates the clutch space from a piston space. The purpose of the piston space is that by pressurizing the piston space, the piston can be moved from an initial position, in which the lock-up clutch is disengaged, in the engaging direction of the lock-up clutch. Thus, by controlling a fluid pressure in the piston space the piston can be moved and thereby the lock-up clutch can optionally be actuated in the disengaging direction or the engaging direction. For this, in particular the piston space has a fluid feed-line of its own, via which hydraulic fluid can be fed into or drained out of the piston space in order to actuate the lock-up clutch. The pressure difference, between the piston space and the clutch space, generates the actuating force of the piston that acts upon the lock-up clutch and correspondingly engages or disengages the lock-up clutch.

When the lock-up clutch is fully engaged, the hydrodynamic power branch of the torque converter is bridged (deactivated) in drive-technology terms, so that the torque on the input side is transmitted, via the lock-up clutch, to the output of the converter. When the lock-up clutch is fully disengaged, only the hydrodynamic branch of the converter is actuated, so that a torque on the input side is transmitted purely hydrodynamically to the output. Owing to the structure of the lock-up clutch as a frictional disk clutch, intermediate clutch positions, between fully disengaged and fully engaged, can also be obtained, whereby the torque on the input side is transmitted partially, via the lock-up clutch, and partially hydrodynamically to the output of the converter.

Preferably, the sealing gap provides a smaller through-flow aperture for the hydraulic fluid flowing through the lock-up clutch than does a gap between the end disk and the first disk carrier. In that way, the sealing gap brings about a larger flow resistance than the area between the end disk and the first disk carrier. Thus, the hydraulic fluid flowing through the clutch flows out of the clutch between the end disk and the first disk carrier more easily than through the sealing gap. Consequently, a directed flow of the hydraulic fluid takes place along the clutch disks in order to carry heat away from the disks.

Preferably, a sealing ring is arranged in the sealing gap. This further seals the sealing gap and so impedes movement of hydraulic fluid through the sealing gap. Thus, even more hydraulic fluid can be guided radially along the clutch disks. The sealing ring is, in particular, a so-termed R-ring (rectangular ring) or X-ring. By virtue of their properties, these are particularly suitable for this application and they are inexpensive. Such an R-ring is a dual-action axially static sealing element with a rectangular or square profile cross-section. An X-ring is a dual-action lipped sealing ring with an x-shaped cross-section.

The sealing ring can be accommodated in a groove in the end disk or in a groove in the sealing element. The groove extends in the circumferential direction. The groove holds the sealing ring in the radial and axial directions. The sealing ring projects out of the groove and rests against the structural element opposite the groove, i.e., the end disk or the sealing element forming a seal. In the area of the groove, the end disk can have an axial extension. Thanks to this extension, sufficient room is provided on the end disk for the groove. The extension can be fitted onto the end disk. In that case, the end disk is made in at least two parts, namely, with a basic body and the fitted-on extension. The groove is then provided, in particular, at the meeting point between the extension and the basic body of the end disk. Instead, the extension can also be an integral part of the end disk. The end disk can then be made as one piece.

Preferably, the sealing element extends in the axial direction between disks of the disk clutch and the second disk carrier. Thus, the sealing element at least partially fills the space between the clutch disks and the second disk carrier. In this case, the sealing element is shaped such that a radial distance between the clutch disks and the sealing element varies along the said axial extension. In other words, the gap between the sealing element and the disks varies along the axial extension of the sealing element. For example, the said distance can vary in one or more steps. In that case, the sealing element has one or more diameter changes. It is also possible for the distance to vary continuously, for example if the sealing element is cone-shaped. In this way, the amount of hydraulic fluid led onto the individual clutch disks can be selectively controlled. A larger radial distance results in a larger radial gap between the disk and the sealing element, so that more hydraulic fluid can flow through there. This flow is applied to those disks which are affected by relatively high friction. Mostly, these are the disks arranged on the piston side of the disk clutch. In contrast, the disks more remote from the piston are less affected, so a relatively smaller amount of hydraulic fluid is enough there.

Preferably, the radial distance between the disks and the sealing element decreases in the direction toward the end disk. In the sealing gap between the end disk and the sealing element, the distance is, therefore, particularly minimal. Consequently a larger amount of hydraulic fluid passes to the more severely affected disks in the area of the piston, while a lesser amount passes to the less severely affected disks in the area of the end disk. The flow distribution of the hydraulic fluid is, thus, optimized in relation to the waste heat generated inside the clutch.

It can be provided that the sealing element extends axially only along part of the clutch disks. For example, the sealing element extends in the axial direction only from the end disk as far as half-way along the disks. That may already be sufficient to achieve a fluid flow in the clutch which is optimized for the cooling.

Preferably, the first disk carrier is the outermost disk carrier of the disk clutch. Correspondingly, the second disk carrier then forms the inner disk carrier of the disk clutch. In that case, the end disk is arranged on the outer disk carrier, while the sealing element is arranged on the inner disk carrier. This arrangement has been found to be advantageous.

The torque converter also has, in particular, a pump wheel and a turbine wheel and a torsion damper. In particular, the pump wheel and the turbine wheel and the torsion damper are accommodated inside the housing of the converter. In particular the pump wheel is made fixed on the housing. The pump wheel and the turbine wheel form a torus for the hydraulic fluid. The turbine wheel can rotate relative to the pump wheel. The torque converter can transmit torque hydrodynamically by virtue of the hydraulic fluid, from the inlet of the latter to its outlet. Depending on the design and operating point of the converter, it is also possible that the converter increases the torque produced at the outlet compared with the torque applied at the inlet, in particular, when an additional stator is used. The torsion damper serves to damp torsion fluctuations between the inlet side and the outlet side of the torsion damper, in particular, such as rotation irregularities of a combustion engine on the inlet side. Thus, torsion irregularities applied at the inlet side are not transmitted to the outlet side, or only so after being damped.

The housing of the converter comprises, in particular, a first housing component, which houses the blades of the pump wheel fixed therein. This housing component is in particular a rear half of the housing (on the transmission side). The housing of the converter comprises, in particular, a second housing component, which accommodates the torsion damper and the lock-up clutch. This housing component is, in particular, a front housing component (on the motor side) of the housing. Thus, the housing is essentially made in two parts. In particular, the said two housing components are joined firmly to one another, for example by welding, in a connection area.

Optionally, a motor vehicle transmission is also proposed which comprises the proposed hydrodynamic torque converter. The transmission has a transmission input shaft. Thus, a drive input torque is fed to the transmission thereby. The output of the torque converter is, in this case, connected rotationally fixed to the transmission input shaft. In particular, the converter is arranged on the transmission input shaft. The motor vehicle transmission can be a multi-stage transmission. The transmission then has a plurality of selectable gear ratios by means of which, in each case, a torque applied on the input side can be transmitted after gearing to the transmission output. In other words, the proposed hydrodynamic torque converter is specially designed for fitting in a motor vehicle transmission.

BRIEF DESCRIPTION OF THE DRAWINGS

Below, the invention is explained in greater detail with reference to figures from which further preferred embodiments of the invention can be seen. The figures show, in each case represented schematically.

DETAILED DESCRIPTION OF THE PREFERRED EMBODIMENTS

Figure 1:
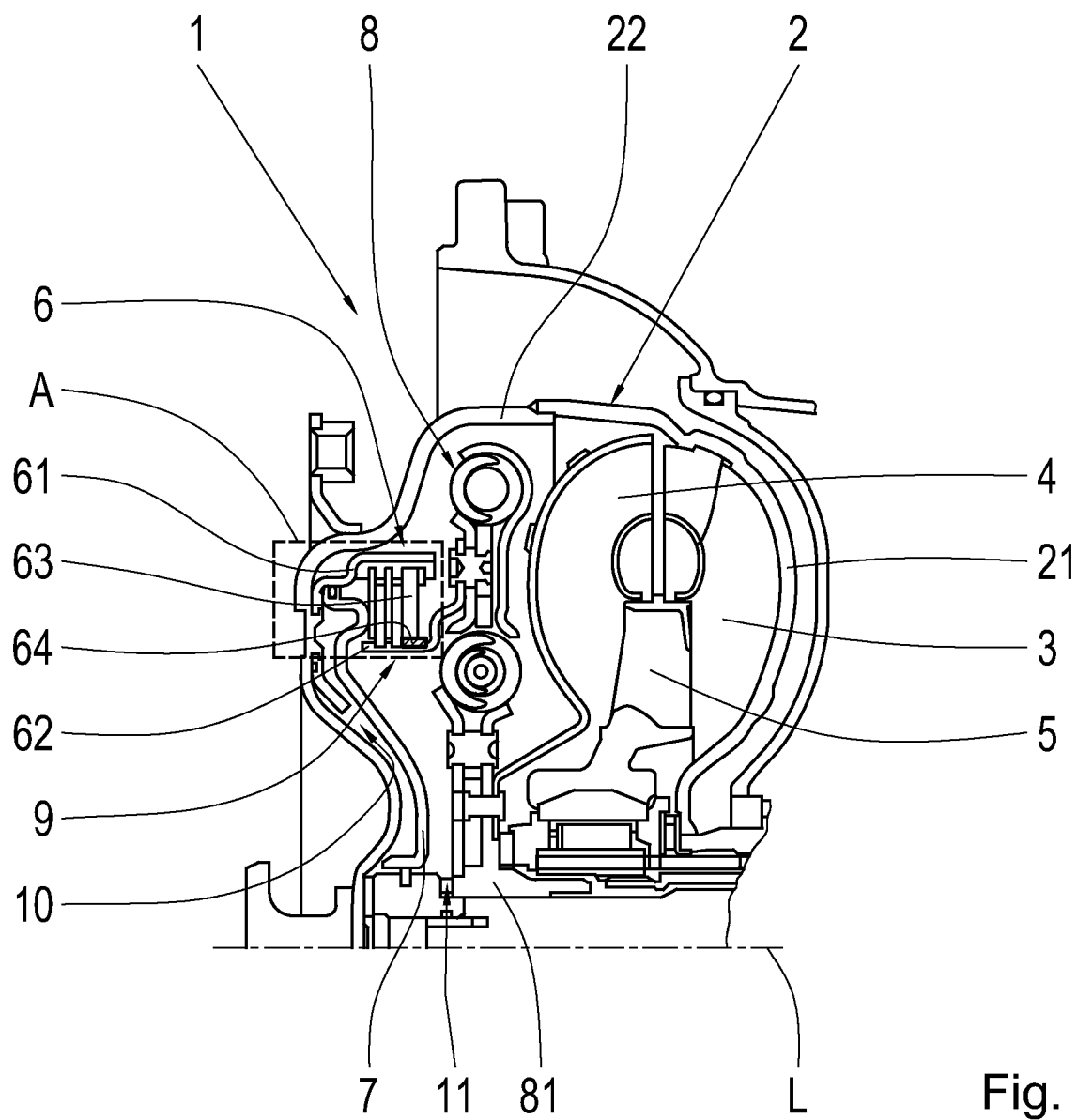
FIG. 1: A hydrodynamic torque converter.

In the figures the same, or at least functionally equivalent structural elements, are given the same indexes. For the sake of clarity, only the upper half of the torque converter 1 is shown in FIG. 1. The lower half can be made mirror-symmetrically thereto.

FIG. 1 shows the upper half of a longitudinal section through a hydrodynamic converter 1. As an example, the converter 1 is arranged on the input side of a motor vehicle transmission (no more of which is shown). In a manner known as such, the converter 1 comprises a multi-component housing 2, a pump wheel 3 and a turbine wheel 4, as well as an optional stator 5. The pump wheel 3 is an integral part of the (rear) housing component 21 on the transmission side, shown on the right in FIG. 1. For this, blading is attached to the said housing component 21. This housing component 21 can, therefore, also be called the pump portion of the housing 2.

The pump wheel 3 and the turbine wheel 4 together form a torus, within which a hydraulic fluid circulates, during the operation of the converter 1, so that a drive torque applied to the housing 2 is hydrodynamically transmitted, via the pump wheel 3, to the turbine wheel 4. This principle is known as the Fottinger principle and, therefore, needs no further explanation. The main rotation axis of the converter 1, which, at the same time, also forms the longitudinal axis of the converter 1, is indexed L. A radial direction extends perpendicularly to it, for example perpendicularly upward/downward in FIG. 1.

A lock-up clutch 6 is provided, inside the housing component 22 (front), shown on the left in FIG. 1. This is in the form of a frictional disk clutch. Thus, the clutch 6 comprises a first disk carrier 61 (the outer disk carrier) on which associated first clutch disks (outer disks) are arranged in a rotationally fixed manner. And the clutch 6 also has a second disk carrier 62 (the inner disk carrier) on which associated second clutch disks (inner disks) are arranged in a rotationally fixed manner. In a known way, the first and second clutch disks are arranged in alternation and form the disk pack of the clutch 6.

The lock-up clutch 6 can be actuated by a piston 7 that can be moved hydraulically in the axial direction. This piston 7 is also arranged in the housing component 22. A drive torque applied on the input side can be transmitted to the output of the converter 1, by way of the clutch 6, bypassing the hydrodynamic power branch of the converter 1. Depending on the contact pressure applied to the disks of the cutch 6, a smaller or larger proportion of the drive torque is transmitted to the output of the converter 1.

During a slipping operation of the clutch 6 and when the clutch 6 is being engaged and disengaged, friction losses in the form of heat are generated in the clutch 6. This heat is dissipated by hydraulic fluid, as much as possible, flowing around the clutch 6 during the operation of the converter 1.

Furthermore, a torsion damper 8 is arranged inside the housing component 22. The purpose of this damper 8 is to damp or eliminate rotation irregularities of the drive torque applied on the input side, in particular, during the use of the clutch 6. A hub 81 serves as the output of the damper 8 and the converter 1. The hub 81 is arranged rotationally fixed on a transmission input shaft. The essential structure of such a damper 8 is also already known as such, and therefore, needs no further explanation.

The clutch 6 is accommodated inside a clutch space 9 of the converter 1. The piston 7 separates this clutch space 9 from the piston space 10. The piston space 10 can be acted upon by fluid pressure, in that pressurized hydraulic fluid is admitted in a controlled manner into the piston space 10. When the fluid pressure in the piston space 10 has sufficiently increased, compared with the clutch space 9, the piston is moved away from its initial position, shown in FIG. 1, in the engaging direction of the clutch 6 (to the right in FIG. 1, toward the torus). Thereby the disks of the clutch 6 are pressed against one another, so the clutch 6 engages. The fluid pressure in the piston space 10 is correspondingly reduced for the subsequent disengaging of the clutch 6. The piston 7 then moves back to its initial position. The clutch 6 is fully disengaged in the initial position shown in FIG. 1.

As explained earlier, heat is generated in the clutch 6 when the clutch 6 is actuated. Thus, a fluid feed opening 11 leads into the clutch space 9 radially inward relative to the clutch 6. Through this, fresh hydraulic fluid flows into the inside of the housing of the converter 1. This hydraulic fluid flows, at least in part, through the clutch 6 and takes up heat from the clutch 6. The heated hydraulic fluid emerges from the converter 1 at other points, in particular, in the area of the pump wheel 3 and/or the stator 5.

The hydraulic fluid flows through the clutch 6 mainly where the flow resistance is lowest. It has been found that the flow resistance is relatively low in the gap between the clutch disks and the associated disk carrier 61, 62 in each case. There, the clutch disks are coupled rotationally fixed to the associated disk carriers 61, 62 by teeth. In contrast, the flow resistance is relatively high between the disks, particularly in the case of a partially or a fully engaged clutch. Together with the flushing of the clutch 6 radially from the inside, it happens that much of the hydraulic fluid passes through the gap between the inner disk carrier 62 and the clutch disks. Flushing of individual clutch disks, with an effective cooling action, takes place only to a slight extent.

A sealing element 64 is now provided on the second disk carrier 62, which is arranged between the end disk 63 of the clutch and the second disk carrier 62, to improve that situation. A sealing gap 12 is formed between the sealing element 64 and the end disk 63.

Figure 2:
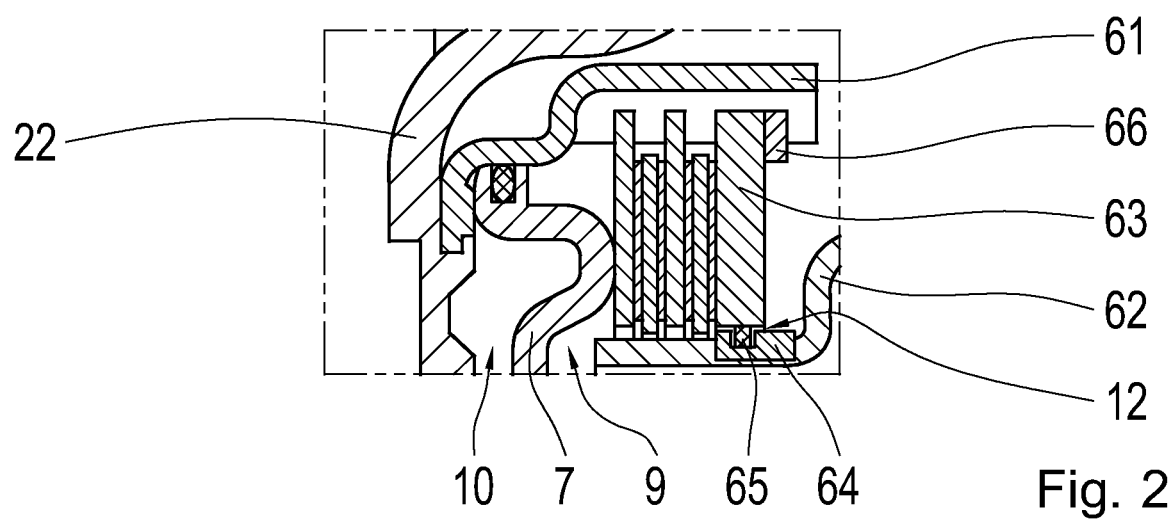
FIG. 2: An enlarged view of the torque converter in FIG. 1,
FIG. 3: An enlarged view of an alternative torque converter.

FIG. 2 shows an enlarged view of the section A shown in FIG. 1, with the sealing element 64.

The end disk 63 is formed by the disk of the clutch 6 facing away from the piston 7. The end disk 63 supports the actuating force of the piston 7 axially against the disk carrier 61. For this, the end disk 63 rests axially against the supporting ring 66, which, in turn, is fixed on the disk carrier 61. The disk carrier 61 carries the end disk 63 in a rotationally fixed manner. The sealing gap 12 is formed radially between the sealing element 64 and the end disk 63. The flow resistance, at that point, is relatively high owing to the sealing gap 12. Thus, the hydraulic fluid flowing through the clutch 6 is diverted in the radial direction so that more of it flows radially around the clutch disks. Accordingly, most of the hydraulic fluid flows through radially from the inside outward between the clutch disks. Then, the hydraulic fluid flows through the gap between the clutch disks and the disk carrier 61 and out of the cutch 6. In this way, the heat dissipation out of the clutch 6 is substantially improved. In this case, the sealing gap 12 has a smaller through-flow aperture, for the hydraulic fluid, than does the radial gap between the end disk 63 and the disk carrier 61.

The opposite outer surfaces of the sealing element 64 and the end disk 63 are cylindrical and arranged coaxially with one another. Thus, when the clutch 6 is disengaged, a relative rotation between the sealing element 64 and the end disk 63 can take place. The sealing element 64 is preferably ring-shaped. By virtue of teeth, the sealing element 64 is arranged rotationally fixed on the disk carrier 62. At the same time, the said teeth serve for coupling the disk carrier 62 rotationally fixed to the associated clutch disks (inner clutch disks). Preferably, the sealing element 64 is fixed to the disk carrier 62 in such a manner that it also stays in place axially. For this, the sealing element 64 is, in particular, clamped onto the disk carrier 62. For example, it is pushed axially and pressed onto the disk carrier 62.

As can be seen in FIG. 2, a sealing ring 65 can be arranged inside the sealing gap 12 which further seals the gap 12. In FIG. 2 the sealing ring 65 is held in a groove of the sealing element 64 and is in contact with the end disk 63. The sealing ring 65 is, for example, an R-ring.

Figure 3:
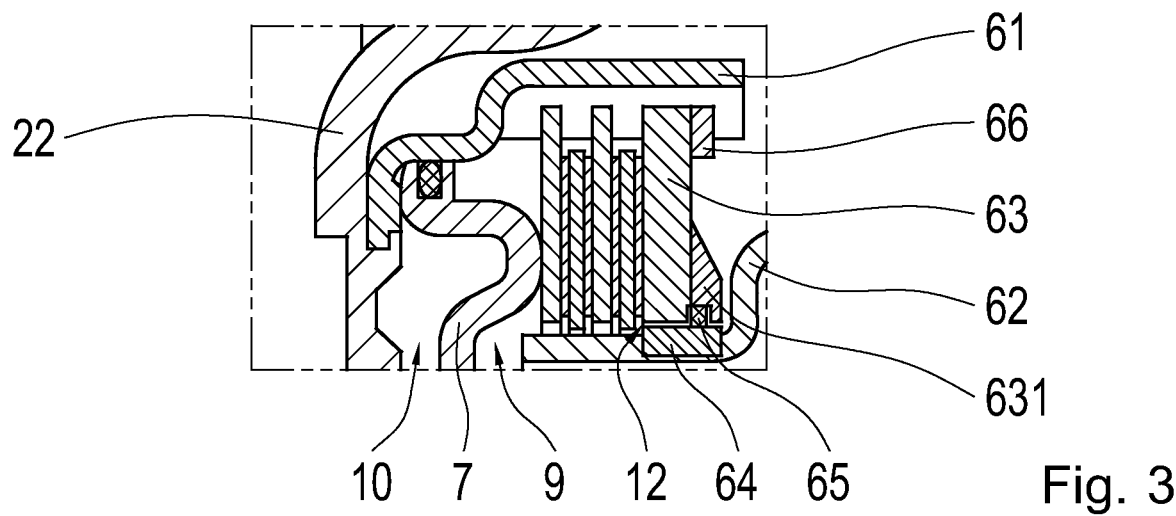

FIG. 3 shows an alternative design of the clutch 6 for the converter 1 in FIGS. 1 and 2. The explanations relating to FIGS. 1 and 2 also apply to the version according to FIG. 3. The difference is that the sealing ring 65 is now held in a groove of the end disk 63 and is in contact with the sealing element 64. So that enough space will be available in the end disk 63 for the groove of the sealing ring 65, the end disk 63 has an axial extension 631. The extension 631 can be an integral part of the disk 63, but it can also be attached to the disk 63.

Figure 4:
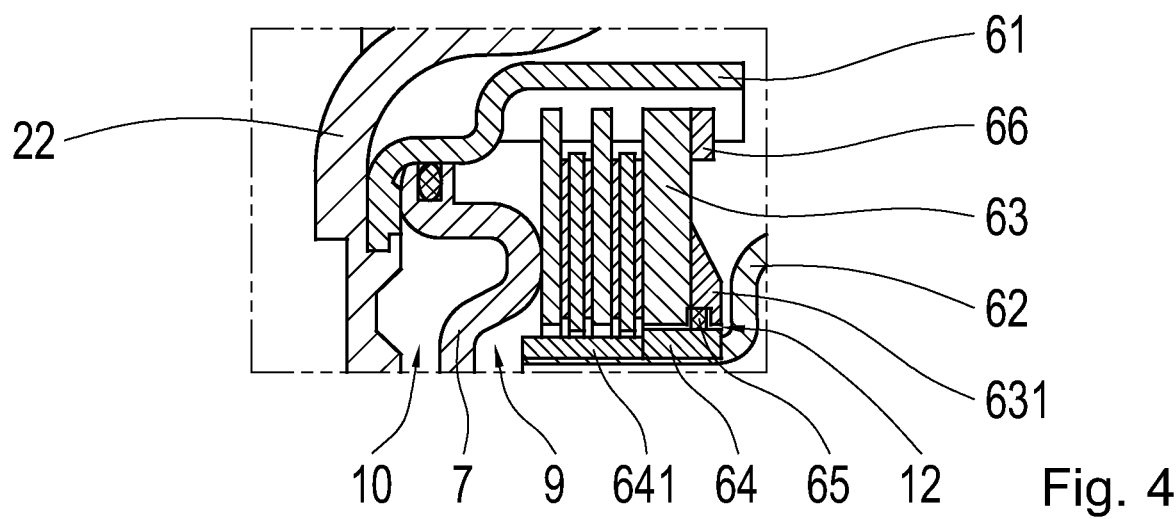
FIG. 4: An enlarged view of an alternative torque converter.

FIG. 4 shows a version of the clutch 6 different from that of FIG. 3. The explanations relating to FIG. 3, therefore, also apply to the version according to FIG. 4. The difference from FIG. 3 is that the sealing element 64 is extended axially in the direction of the piston 7 (axial extension 641). In this case, the sealing element 64 extends, on the piston side, as far as the end of the clutch 6. Moreover, the sealing element 64 has a step-like diameter change, at the end disk 63, so that there the radial distance between the end disk 63 and the sealing element 64 is minimal. In other words, the gap between the clutch disks and the disk carrier 62, in the direction of the end disk 63, is increasingly filled by the sealing element 64. The axial space through which flow can take place, in the area of the sealing gap 12, is therefore minimal. In that way, the flow resistance in the gap between the clutch disks and the disk carrier 62 increases in the direction of the end disk 63. This further diverts the fluid flow in the direction toward the piston 7. Thus, more hydraulic fluid flows in the radial direction over the clutch disks located in the area of the piston 7. In contrast, the clutch disks, in the area of the end disk 63, have less hydraulic fluid flowing over them in the radial direction. Consequently the flow is selectively greater over the disks near the piston 7, which are more severely affected. It is possible for the diameter change of the sealing element 64 to be continuous instead of step-wise, for example, if the extension 641 is of conical shape.

The extension 641 of the sealing element 64 can be formed by pin-like attachments. In particular, in each tooth gap between the teeth of the disk carrier 62 an extension of the sealing element 64 corresponding thereto is arranged, which partially fills the gap between the disk carrier 62 and the clutch disks.

Figure 5:
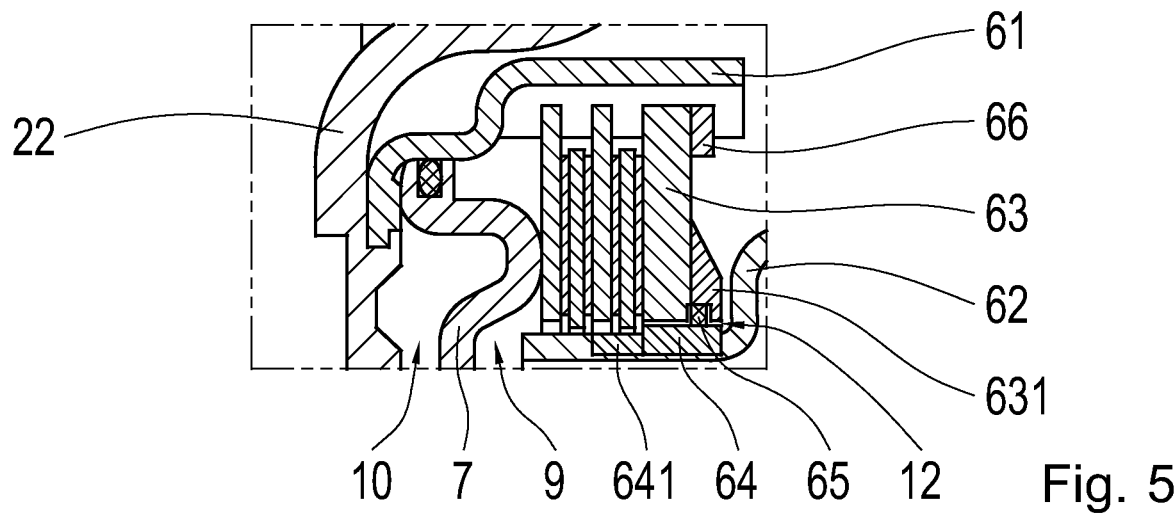
FIG. 5: An enlarged view of an alternative torque converter.

FIG. 5 shows a version of the clutch 6 which differs from that of FIG. 4. The explanations relating to FIG. 4, therefore, also apply to the version in FIG. 5. The difference from FIG. 4 is that the sealing element 64 now extends in the axial direction only as far as about half-way along the clutch disks. In contrast to the extension 641 in FIG. 4, the extension 641 of the sealing element 64 is, therefore, shorter. This results in a further optimization of the flow through the clutch 6. The gap between the clutch disks and the disk carrier 62 is, thereby, increasingly filled in the direction of the end disk 63 by the sealing element 64 and the flow resistance there is thus increased more and more. The severely affected clutch disks, in the area of the piston 7, are radially flushed with the largest amount of hydraulic fluid. In contrast, the least affected clutch disks in the area of the end disk 63 are radially flushed with the smallest amount of hydraulic fluid. The clutch disks in the middle are exposed to a middling amount of thermal stress. By virtue of the extension 641, compared with the clutch disks at the ends, they are flushed with hydraulic fluid to a medium extent which, however, is sufficient there.

In this case too it is possible for the diameter change of the sealing element 64 to be continuous instead of step-wise, for example, if the extension 641 is of a conical shape.

INDEXES

1 Hydrodynamic torque converter
2 Housing
21 Housing component
22 Housing component
3 Pump wheel
4 Turbine wheel
6 Converter lock-up clutch
61 Disk carrier, outer disk carrier
62 Disk carrier, inner disk carrier
63 End disk
631 Extension of the end disk
64 Sealing element
641 Extension of the sealing element
65 Sealing ring
66 Supporting ring
7 Piston
8 Torsion damper
81 Damper hub
9 Clutch space
10 Piston space
11 Fluid feed opening
12 Sealing gap
A Area
L Main rotation axis, longitudinal axis

The invention claimed is:

1. A hydrodynamic torque converter with a lock-up clutch in a form of a disk clutch in a clutch space and with a piston for actuating the lock-up clutch,
   the lock-up clutch having an end disk and a first disk carrier, on which the end disk being radially and axially supported,
   the end disk being arranged on a side of the lock-up clutch remote from the piston,
   the lock-up clutch having a second disk carrier,
   wherein a sealing element is arranged on the second disk carrier,
   a sealing gap is formed between the end disk and the sealing element,
   the sealing element extends axially between clutch disks of the lock-up clutch and the second disk carrier, and
   the sealing element is shaped such that a radial distance between the clutch disks and the sealing element varies along an axial extension.

2. The torque converter according to claim 1, wherein the sealing gap provides a smaller through-flow aperture for a hydraulic fluid flowing through the lock-up clutch than a gap between the end disk and the first disk carrier.

3. The torque converter according to claim 1, wherein a sealing ring is arranged in the sealing gap.

4. The torque converter according to claim 3, wherein the sealing ring is held in a groove in either the end disk or the sealing element.

5. The torque converter according to claim 1, wherein the radial distance, between the clutch disks and the sealing element, decreases in a direction toward the end disk.

6. The torque converter according to claim 5, wherein the sealing element extends axially along only part of the clutch disks.

7. The torque converter according to claim 1, wherein the sealing element extends axially along only part of the clutch disks.

8. The torque converter according to claim 1, wherein the first disk carrier is an outer disk carrier of the lock-up clutch and the second disk carrier is an inner disk carrier of the lock-up clutch.

9. The torque converter according to claim 1, wherein the sealing element is pressed or clamped onto the second disk carrier.

10. The torque converter according to claim 1, wherein, radially inward relative to the lock-up clutch, an inlet opening for hydraulic fluid for lubricating and/or cooling the lock-up clutch leads into the cutch space.

* * * * *